United States Patent [19]

Stellwagen, Jr.

[11] Patent Number: 5,835,755
[45] Date of Patent: Nov. 10, 1998

[54] MULTI-PROCESSOR COMPUTER SYSTEM FOR OPERATING PARALLEL CLIENT/SERVER DATABASE PROCESSES

[75] Inventor: Richard G. Stellwagen, Jr., San Diego, Calif.

[73] Assignee: AT&T Global Information Solutions Company, Dayton, Ohio

[21] Appl. No.: 222,404

[22] Filed: Apr. 4, 1994

[51] Int. Cl.$^6$ .................................................. G06F 17/30
[52] U.S. Cl. ................................. 395/600; 364/DIG. 1; 364/282.1; 364/283.4; 395/650
[58] Field of Search ................................. 395/600, 800, 395/650

[56] References Cited

U.S. PATENT DOCUMENTS

| | | | |
|---|---|---|---|
| 4,412,285 | 10/1983 | Neches et al. | 395/650 |
| 4,445,171 | 4/1984 | Neches | 395/325 |
| 4,543,630 | 9/1985 | Neches | 395/200 |
| 4,814,979 | 3/1989 | Neches | 395/650 |
| 4,925,311 | 5/1990 | Neches et al. | 395/650 |
| 4,945,471 | 7/1990 | Neches | 395/325 |
| 4,956,772 | 9/1990 | Neches | 395/650 |
| 5,006,978 | 4/1991 | Neches | 395/650 |
| 5,276,899 | 1/1994 | Neches | 395/800 |
| 5,303,383 | 4/1994 | Neches et al. | 395/500 |
| 5,325,525 | 6/1994 | Shah et al. | 395/650 |

OTHER PUBLICATIONS

Dr. Philip M. Neches, "The YNET: An Interconnect Structure for a Highly Concurrent Data Base Computer System," Teradata Corporation, 1988.

*Primary Examiner*—Paul V. Kulik
*Attorney, Agent, or Firm*—Merchant, Gould, Smith Edell, Welter & Schmidt

[57] ABSTRACT

A method and apparatus for operating parallel databases in a multi-processor computer system. Client Applications interact with a Navigation Server executing on the computer system, and through it, with one or more Data Servers. The Navigation Server receives requests from the Client Applications, which it compiles or translates into a plurality of parallel SQL statements. These parallel SQL statements are communicated to particular ones of the Data Servers for execution. The Data Servers, each of which may execute on different processors in the computer system, perform their respective SQL statements and thus access their database partitions concurrently and in parallel, thereby reducing the overall access time of a given request from a given Client Application. The computer system behaves, and is presented to users, as if the database resides under the control of a single Data Server, even though the database is partitioned across multiple Data Servers.

24 Claims, 9 Drawing Sheets

RANGE PARTITIONING

HASH PARTITIONING

SCHEMA PARTITIONING

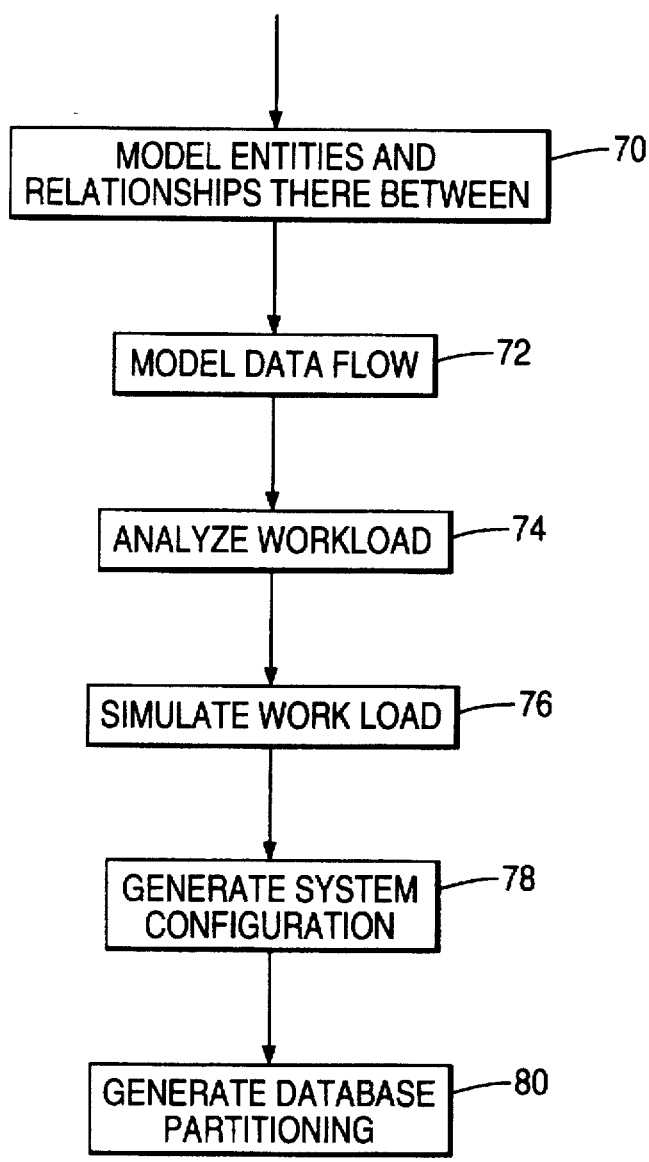

5,835,755

MULTI-PROCESSOR COMPUTER SYSTEM FOR OPERATING PARALLEL CLIENT/ SERVER DATABASE PROCESSES

BACKGROUND OF THE INVENTION

1. Field of the Invention

This invention relates in general to computer systems, and in particular, to a method and apparatus for operating parallel databases in a multi-processor computer system.

2. Description of Related Art

Since the early days of data processing, users demands for processing capabilities have taxed the architecture of standard computer systems. Indeed, most companies have responded to increased demands by their users by periodically replacing their current computer system with the next larger computer system in an attempt to satisfy or stay ahead of users' demands.

Moreover, as technology lagged the growth curve for users demands, manufacturers have placed multiple processors within the same system to provide additional performance. Specifically, the use of multi-processor computer systems is considered an advantageous approach to large database-oriented computer systems. Generally, parallelism provides two major advantages: (1) the ability to perform multiple tasks concurrently, and (2) the ability to apply multiple resources to a single function. Examples of such systems include both the NCR 3600 and the Teradata DBC/1012 multi-processor computer systems. These systems are widely used in retail, service, and manufacturing industries to manage and process large volumes of data.

The need to manipulate large databases in a consistent manner has also led to the development of standardized DataBase Management System (DBMS) software employing the Structured Query Language (SQL) standard. Such DBMS software often provides increased performance when used on parallel multi-processor computer systems. However, DBMS software has not heretofore been designed to take advantage of the parallel nature of multi-processor computer systems nor has DBMS software been constructed for optimum performance on multi-processor computer systems.

Typically, DBMS software is comprised of a client/server process structure, wherein the client receives a request for data from the user, the client transmits that request to the server, the server accesses the desired data, the server returns a response to the client, and the client transmits the response to the user. In such situations, there is usually little opportunity for injecting "parallelism" into the user's request. Typically, the only parallelism available is the parallel execution of different requests from different users on different processors in a multi-processor system. However, such parallelism provides few advantages to the individual user.

To achieve parallelism for an individual user, a multi-processor computer system needs to simultaneously process multiple requests from a single user in parallel. However, most users do not make such multiple simultaneous requests. Instead, most users work on tasks sequentially and thus make requests to the DBMS software sequentially.

Trends in DBMS software design and usage are increasing the demand for sharing resources and data between many users. This is true even when a multi-processor system is used, since the databases supported thereon are often commonly shared between users and transactions. The access contention for the database, and the collisions arising therefrom, have a direct effect on transaction response time and systems performance.

One common method of reducing collisions is to duplicate the database or increase the amount of hardware available, so that it is less likely that the user will have to share resources with other users in the completion of transactions. However, such techniques, while temporarily successful in minimizing contention, tend to be very costly. Moreover, the additional resources are often not used efficiently, and may be idle much of the time.

All of these issues make DBMS software operating in a parallel multi-processor computer system an attractive candidate for performance enhancing design techniques. The overhead incurred in DBMS software will undoubtedly become more significant as more sophisticated applications are developed and the number of transactions and users increase. Thus, there is a need for DBMS software that takes advantage of the parallelism inherent in multi-processor computer systems and that is structured for optimum performance thereon.

SUMMARY OF THE INVENTION

To overcome the limitations in the prior art described above, and to overcome other limitations that will become apparent upon reading and understanding the present specification, the present invention discloses a method and apparatus for operating parallel databases in a multi-processor computer system. In the present invention, Client Applications interact with a Navigation Server executing on the system, and through it, with one or more Data Servers. The Navigation Server receives requests from the Client Applications, which it compiles or translates into a plurality of parallel SQL statements. These parallel SQL statements are communicated to particular ones of the Data Servers for execution. The Data Servers, each of which may execute on different processors in the system, perform their respective SQL statements and thus access their database partitions concurrently and in parallel, thereby reducing the overall access time of a given request from a given Client Application. However, the system behaves, and is presented to users, as if the database resides under the control of a single Data Server, even though the database is partitioned across multiple Data Servers.

An object of the present invention is to increase the performance of DBMS software executed by multi-processor computer systems. The present invention provides faster query response time, increased throughput in the computer system, and faster access times to larger databases. In addition, the present invention supports higher transaction rates.

Another object of the present invention is to provide a structure and architecture for DBMS software that takes full advantage of the parallelism inherent in multi-processor computer systems. The advantage of such parallelism is the ability to scale-up transaction rates, to scale-up database size, and to speed-up response times.

Still another object of the present invention is the ability to handle numerous types of database partitions without affecting response times or transaction rates. Moreover, the present invention shelters users from knowing the details of data partitioning, database location, physical database design, or access techniques.

BRIEF DESCRIPTION OF THE DRAWINGS

Referring now to the drawings in which like reference numbers represent corresponding parts throughout:

FIG. 8 illustrates the flow of execution for the automated configuration process in the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The general concept of the present invention is a method and apparatus for operating parallel databases in a multi-processor computer system. The present invention provides mechanisms for creating a highly available, scaleable database machine. In addition, users are sheltered from data partitioning, database location, physical database design, and access techniques.

Figure 1:
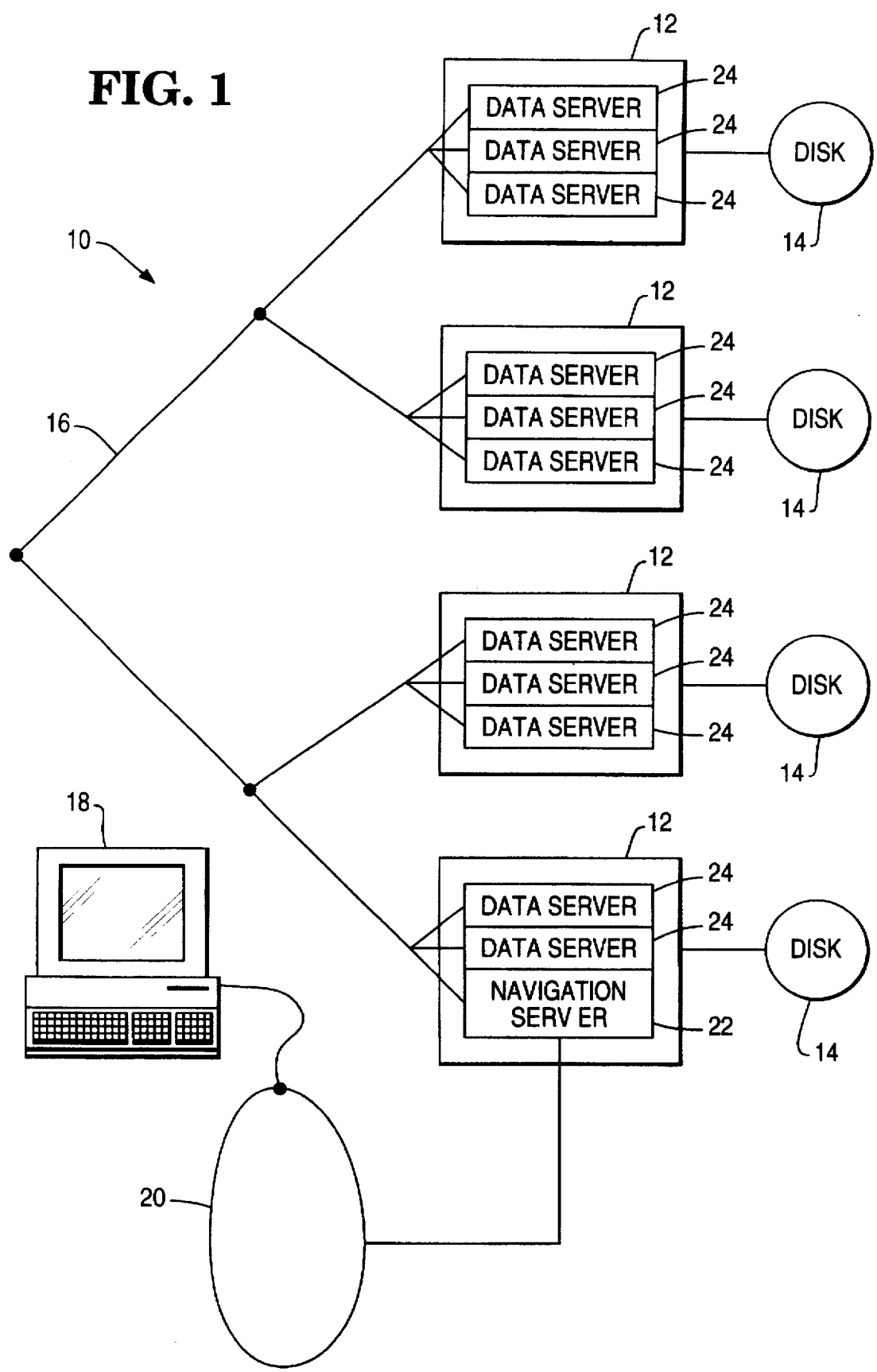
FIG. 1 illustrates the computer hardware environment of the present invention.

FIG. 1 illustrates the computer hardware environment of the present invention. A computer system 10 is comprised of a plurality of processors 12 managing a plurality of disk drives 14 that store one or more databases. The processors 12 communicate among themselves via a high-speed network 16. A plurality of workstations 18 are coupled to the multi-processor computer system 10 via a local area network 20 or other means. Users at the workstations 18 perform various search and retrieval functions against the databases, typically using DataBase Management System (DBMS) software that incorporates the Structured Query Language (SQL) standard. The DBMS software is comprised of a number of different tasks, including one or more Navigation Servers 22 and a plurality of Data Servers 24 executed by the multi-processor computer system 10, and one or more Client Applications 26 executed by the workstations 18.

Figure 2:
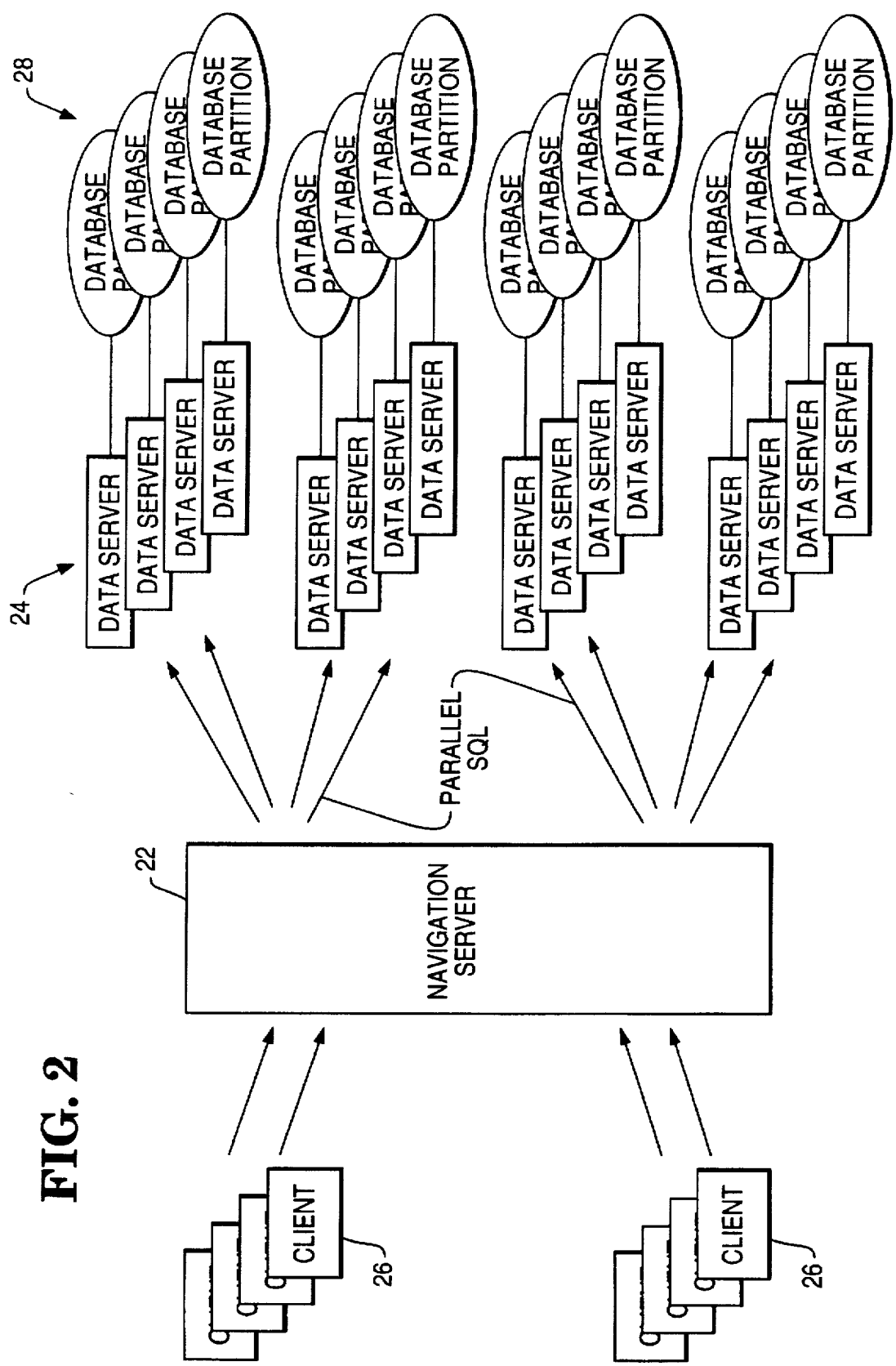
FIG. 2 further illustrates the logical flow between the various tasks of the Database Management System in the present invention.

FIG. 2 further illustrates the logical flow between the various tasks of the DBMS software in the present invention. The Client Applications 26 interact with users. In prior art systems, the Client Applications 26 would communicate with a single Data Server 24. In the present invention, each Client Application 26 interacts instead with a Navigation Server 22 and then with one or more Data Servers 24. The Navigation Server 22 receives requests from the Client Applications 22, which it compiles or translates into a plurality of parallel SQL statements. These parallel SQL statements are communicated to particular ones of the Data Servers 24 for execution. The Data Servers 24, each of which may execute on different processors 12, perform their respective SQL statements and thus access their database partitions 28 concurrently and in parallel, thereby reducing the overall access time of a given request from a given Client Application 26. The system 10 behaves, and is presented to users, as if the database resides under the control of a single Data Server 24, even though the database is partitioned across multiple Data Servers 24.

Figure 3:
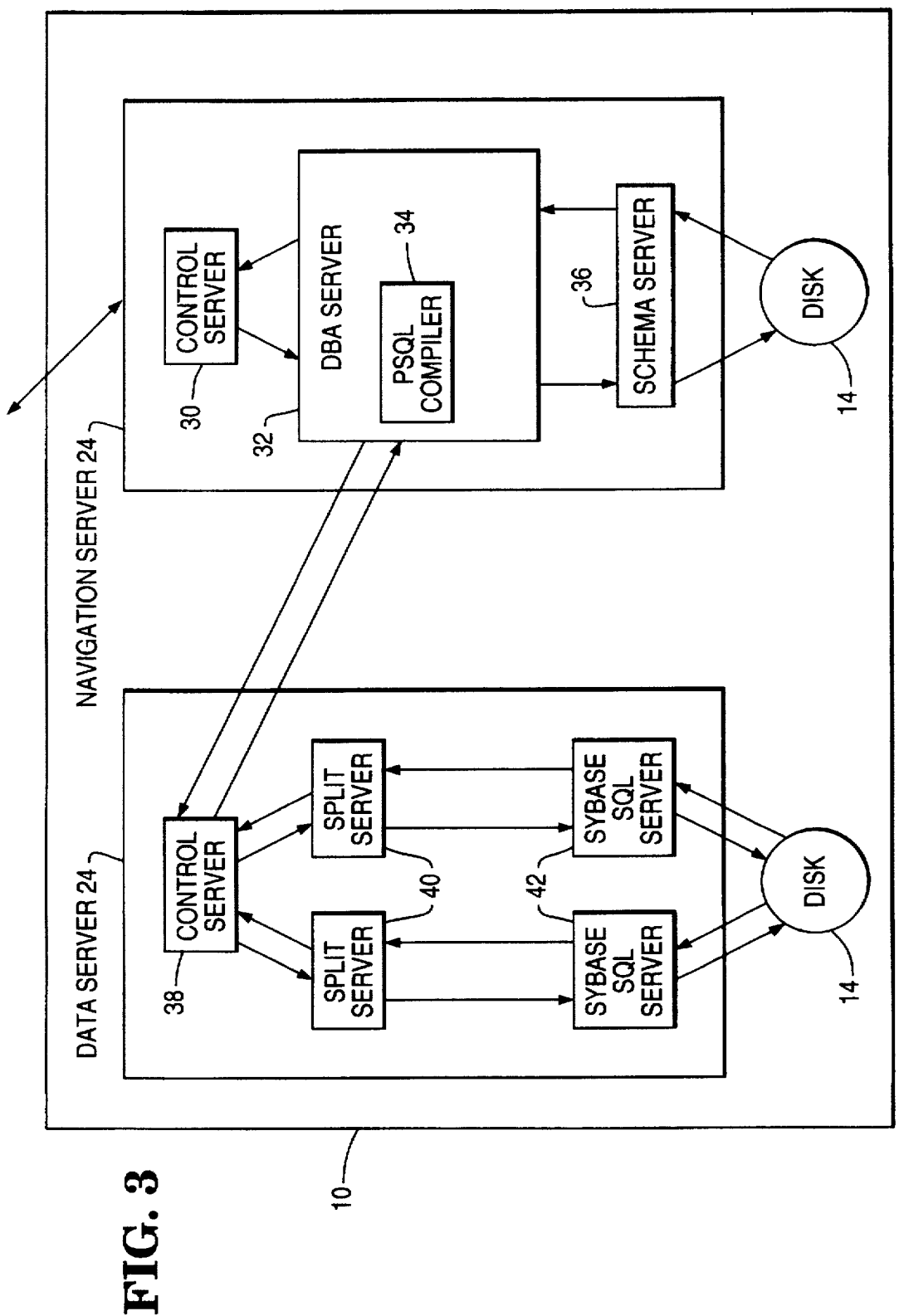
FIG. 3 illustrates the components of the Navigation Server and the Data Server in the present invention.

FIG. 3 illustrates the components of the Navigation Server 22 and the Data Server 24 in the present invention. The Navigation Server 22 comprises a Control Server 30, DBA Server 32, Schema Server 36, and Parallel SQL (PSQL) Compiler 34. The Data Server 24 comprises a Control Server 38, Split Server 40, and SYBASE™ SQL Server 42.

The Control Server 30 is a multiple-thread gateway process that interfaces between the Client Application 26 and the Navigation Server 22. A user chooses a Control Server 30 to establish a session and the Control Server 30 maintains the user's session context. The Control Server 30 also controls execution of queries, merges preliminary results returned from multiple Data Servers 24, and returns final results to the Client Application 26.

The DBA Server 32 is a gateway process that is the central point of system management for the Navigation Server 22. All schema changes are processed by the DBA Server 32, which also performs monitoring and recovery functions.

The Schema Server 36 contains a persistent copy of the global directory used by the Navigation Server 22, which directory contains system configuration and database partitioning information. The global directory may indicate the exact location of the data and thus the identity of the Data Servers 24 that are used to access particular values of the data.

The PSQL compiler 36 is a module within the DBA Server 32 that determines the execution strategy for the user's request, based on the partitioning of the tables referenced in the request, and from that generates queries.

The Navigation Server 22 supports two types of queries, i.e., ad-hoc queries and stored procedures. Stored procedures are pre-defined sets of "parallel" SQL statements stored in a library of such procedures. These sets comprise a plurality of SQL statements that can be performed concurrently and in parallel by a plurality of Data Servers 24. Moreover, the sets can include additional SQL statements that merge or join or otherwise combine the results of these independently performed SQL statements, and then, if desired, perform additional operations on the merged results. Multiple levels of such operations are possible. Finally, one set of results emerges from the operations and is returned to the Client Application 26.

The stored procedures can be manually generated and stored in the library for later retrieval in response to the user request. Alternatively, the stored procedures can be parallel SQL statements previously compiled by the PSQL Compiler 36 and then stored in the library for later retrieval in response to the user request. Stored procedures greatly decrease the amount of time required to interpret a user request by eliminating the need to convert or translate the user request into parallel SQL statements. Moreover, stored procedures are re-entrant so that multiple users can request execution of the stored procedures simultaneously.

Ad-hoc queries are compiled into parallel SQL statements at the time the user request is entered. Typically, ad-hoc queries are discarded immediately after execution, whereas stored procedures are re-used as necessary. The compilation of ad-hoc queries can be quite time-consuming and thus greatly increases the time required to complete the user request.

The Data Server 24 is a database engine maintaining its own disk storage. It manages and accesses fragments of databases and tables as assigned by the Navigator Server 22. However, each Data Server 24 is autonomous and is completely unaware of the fact that it is part of a Navigation Server 22 configuration. Moreover, there can be any number of Data Servers 24 in a Navigation Server 22 configuration.

The Control Server 38 is a multiple-thread gateway process that interfaces between the Navigation Server 22 and the Data Server 24. The Control Server 38 maintains the communication links with the Navigation Server 22 and maintains the user's session context as queries are being executed by the Data Server 24. The Control Server 38 is the main interpreter in the Navigation Server 22 and it executes Control Modules (each query plan contains one Control Module) produced by the PSQL Compiler 34.

The Split Server 40 is a special purpose gateway which works with other Split Servers 40 while re-distributing data into work tables contained on the Data Servers 24. The Split Servers 40 are used by the Control Servers 38 when execution of a query plan requires the re-distribution of data among the Data Servers 24. The Split Server 40 acts in one of the three modes: master, split slave or merge slave. In the master mode, the Split Server 40 initiates and monitors the progress of re-distribution functions. In merge mode, the Split Server 40 connects to its "local" SQL Server 42 and initiates a data load operation. In slave mode, the Split Server 40 connects to its "local" SQL Server 42, issues a SQL statement generated by-the PSQL Compiler 34 for execution by the SQL Server 42, extracts the results, and returns the results to the appropriate master Split Server 40 in merge mode. The Split Server 40 in merge mode receives the results from the slave Split Server 40 and forward the rows to the master Split Server 40. When all slave Split Servers 40 are done, the master Split Server 40 initiates the required termination steps and returns the completed request to the Control Server 38.

The SQL Server 42 is a standard SYBASE™ SQL Server 42. The SQL Server 42 is typically single threaded in that it can handle at most one request at a time. Multiple SQL Servers 42 may be active within the Data Server 24 to handle multiple request from one or more users. The SQL Server 42 includes an interpreter that executes all different types of SQL statements.

PARALLEL EXECUTION

Figure 4A:
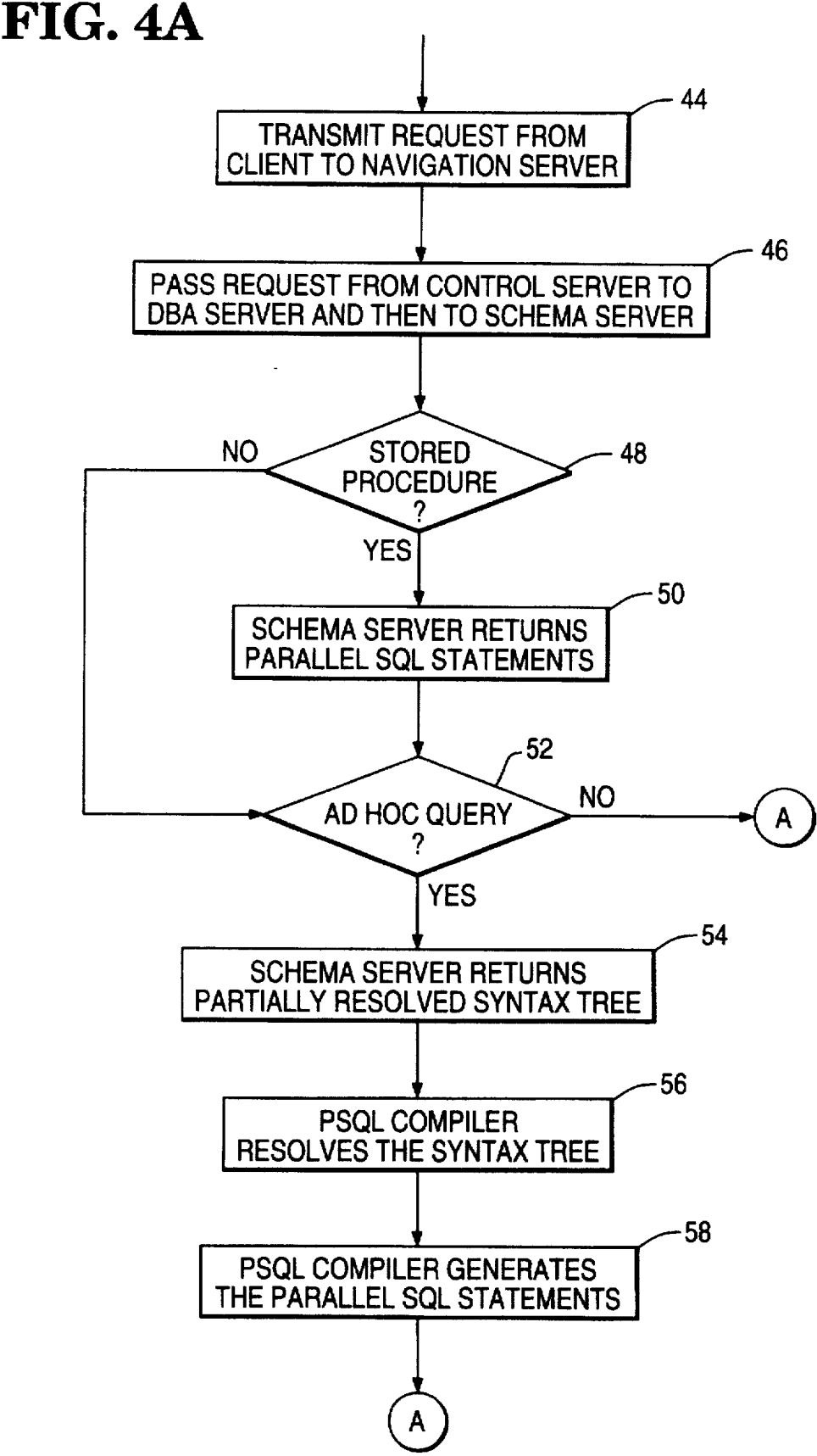
FIGS. 4A and 4B illustrate the flow of execution for the user requests in the present invention.
Figure 4B:
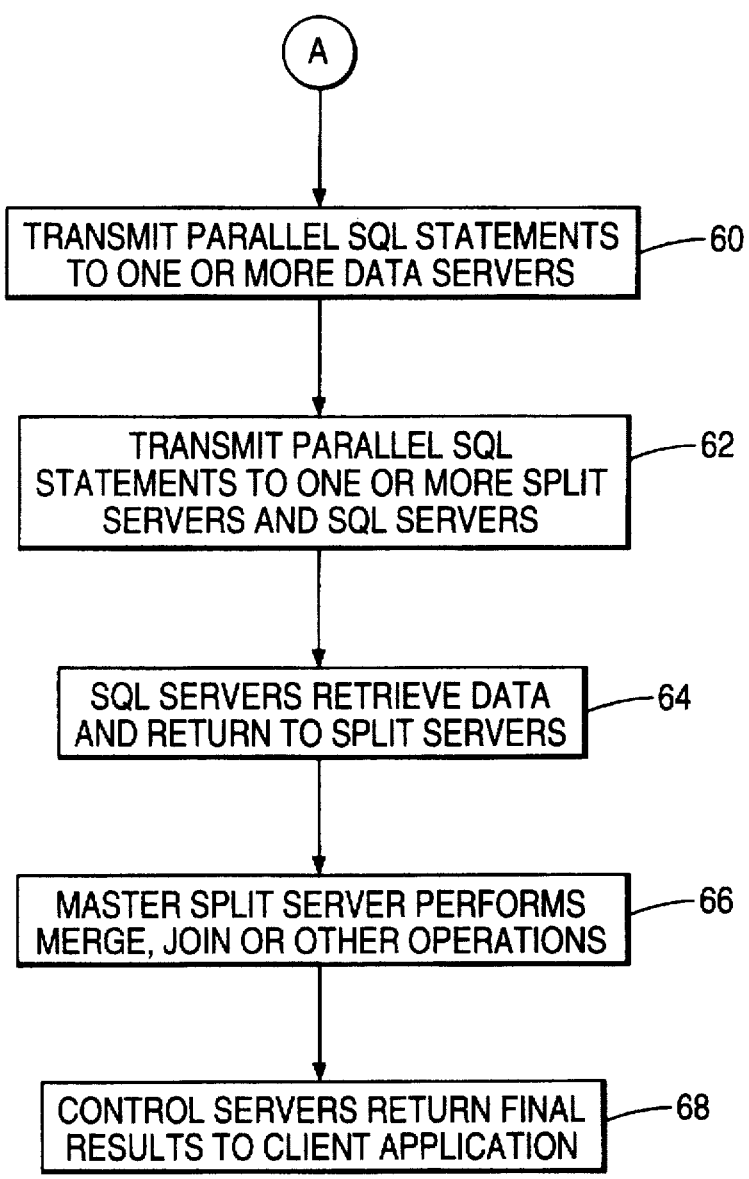

FIGS. 4A and 4B illustrate the flow of execution for the user requests in the present invention. Block 44 represents the user request being transmitted from the Client Application 26 to the Navigation Server 22. Block 46 represents the Control Server 30 within the navigation server 22 passing the request to the DBA Server 32 and then down to the Schema Server 36. Block 48 is a decision block that determines whether the user request is a stored procedure. If so, control transfers to block 50; otherwise, control transfers to block 52. Block 50 represents the Schema Server 36 returning the parallel SQL statements for the stored procedure. Block 52 is a decision that determines whether the user request is an ad-hoc query. If so, control transfers to block 54; otherwise, control transfers to block 60. Block 54 represents the Schema Server 36 returning a syntax tree for the user request. Block 56 represents the PSQL compiler 34 resolving the trees and optimizing the request. Block 58 represents the PSQL compiler generating parallel SQL statements. Block 60 represents the DBA Server 32 transmitting the parallel SQL statements to the Control Servers 38 in one or more Data Servers 24. Block 62 represents the Control Server 38 receiving the parallel SQL statements and assigning individual SQL statements to one or more paired Split Servers 40 and SQL Servers 42 that control all the partitions of the table accessed in the SQL statement. Block 64 represents the SQL Servers 42 retrieving data and returning the data to the Split Servers 40, which in turn communicate with a master Split Server 40 to re-distribute the data in the form of temporary copies of tables and partitions. Once these temporary tables and partitions are created, block 66 represents the master Split Server 42 performing merge, join or other operations. Block 68 represents the Control Server 38 receiving results from each of the master Split Servers 40, and returning the final results to the Client Application 26.

Figure 5:
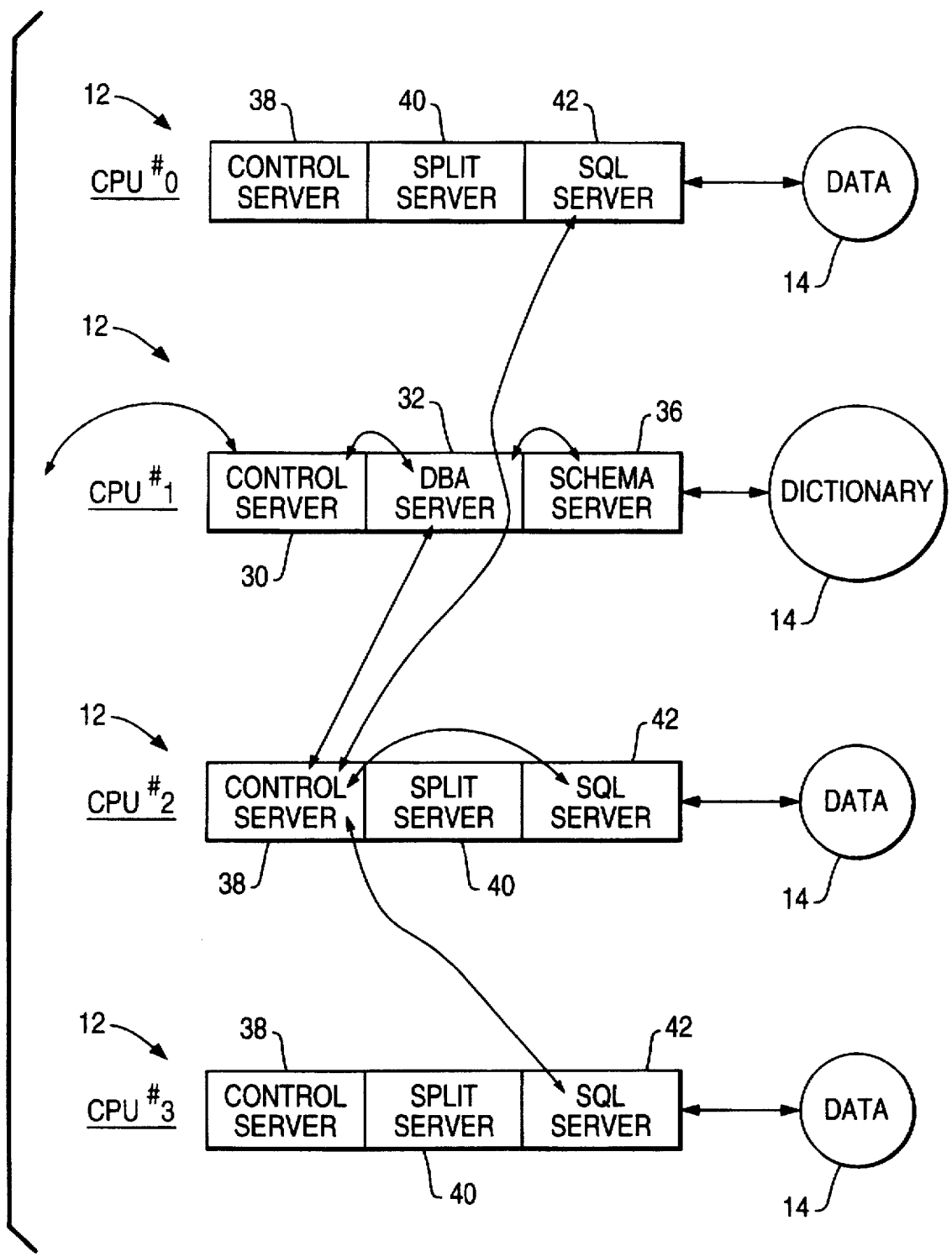
FIG. 5 illustrates the dataflow for a table scan request according to the present invention.

FIG. 5 illustrates the dataflow for a table scan request according to the present invention. The user request is transmitted from the Client Application 26 to the Control Server 30 of the Navigation Server 22, which is executing on CPU #1. The Control Server 30 passes the request to the DBA Server 32 and then down to the Schema Server 36. The DBA Server 32 passes the parallel SQL statements to the Control Server 38, which is executing on CPU #2. The Control Server 38 issues the SQL statements in parallel to SQL Servers 42 executing on CPUs #0, #2, and #3. These are the SQL Servers 42 that control all the partitions of the table being accessed by the SQL statements. The Control Server 38 receives preliminary results from each of the SQL Servers 42 and merges the preliminary results into a final result that is returned to the Client Application 26.

Figure 6:
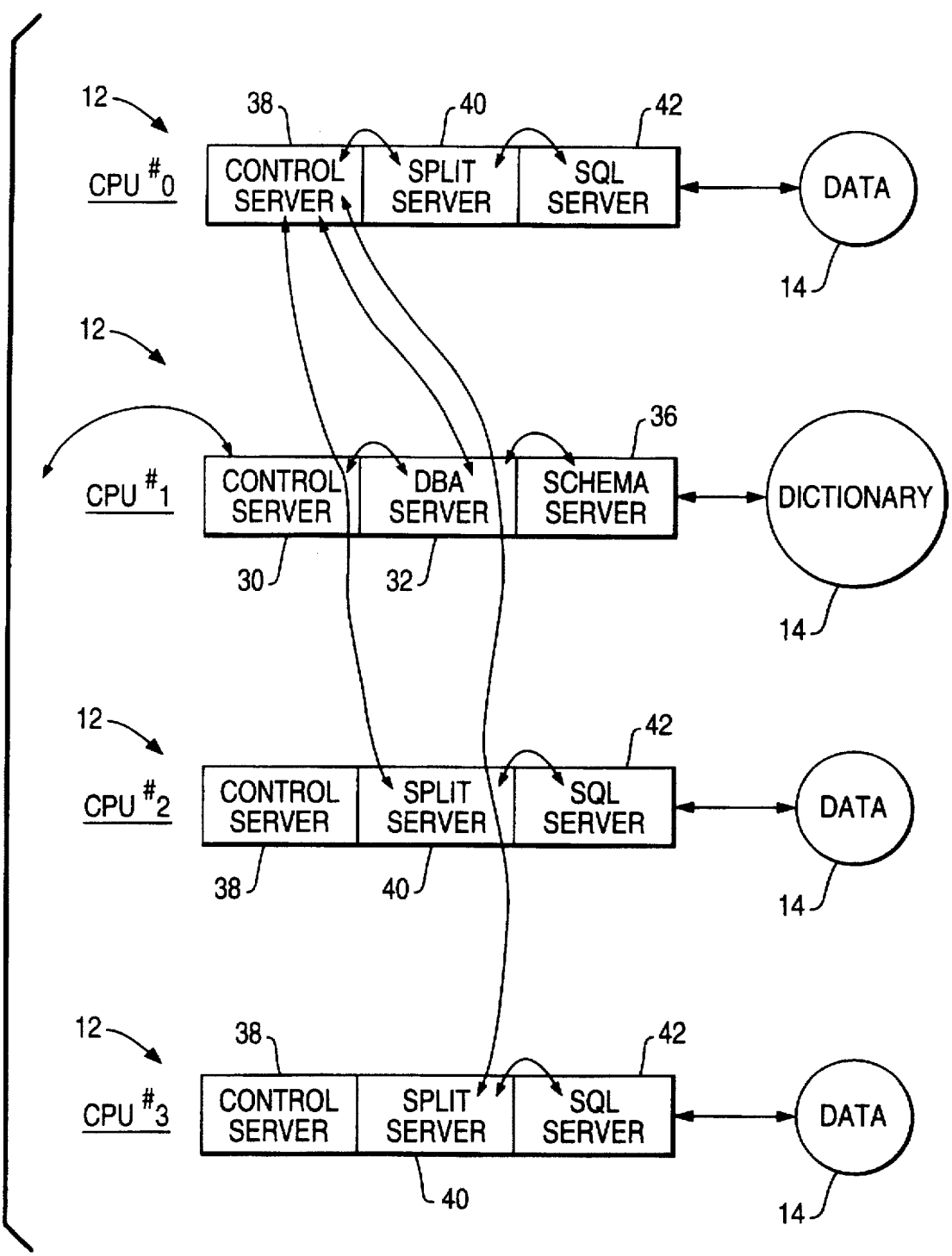
FIG. 6 illustrates the dataflow for a join operation according to the present invention.

FIG. 6 illustrates the dataflow for a join operation according to the present invention. The user request is transmitted from the Client Application 26 to the Control Server 30 of the Navigation Server 22, which is executing on CPU #1. The Control Server 30 passes the request to the DBA Server 32 and then down to the Schema Server 36 to retrieve the parallel SQL statements from the dictionary. The DBA Server 32 passes the parallel SQL statements to the Control Server 38, which is executing on CPU #0. The Control Server 38 issues the SQL statements in parallel to Split Servers 40 executing on CPUs #0, #2, and #3. Each of the Split Servers 40 then passes the SQL statements to their associated SQL Server 42 that control the desired partitions or tables. The data retrieved by each of the SQL Servers 42 is returned to their associated Split Servers 40. At this point, one of the Split Servers 40 may become the master Split Server 40, which communicates with the other Split Servers 40 in the system to re-distribute data in the form of temporary copies of partitions so that join operations may take place. The Control Server 38 receives preliminary results from each of the Split Servers 40 (or only from the master Split Server 40 in certain circumstances) and merges the preliminary results into a final result that is returned to the Client Application 26.

The Data Navigator 22 employs two fundamental strategies for how two tables can best be brought together for the purposes of a join operation. One strategy is to perform a "redecluster" operation that moves rows from both tables based on their joining columns into a new home or to move the rows from one of the tables based on its joining columns into the home of the other table. The other strategy is to perform a replicate operation wherein one table is replicated on each Data Server 24 of the other table's home. Both of these strategies require sufficient disk space for the temporary' database to service the request, and the amount of space required varies with the work load and type of join operations being issued.

HETEROGENOUS DATABASES

Figure 7A:
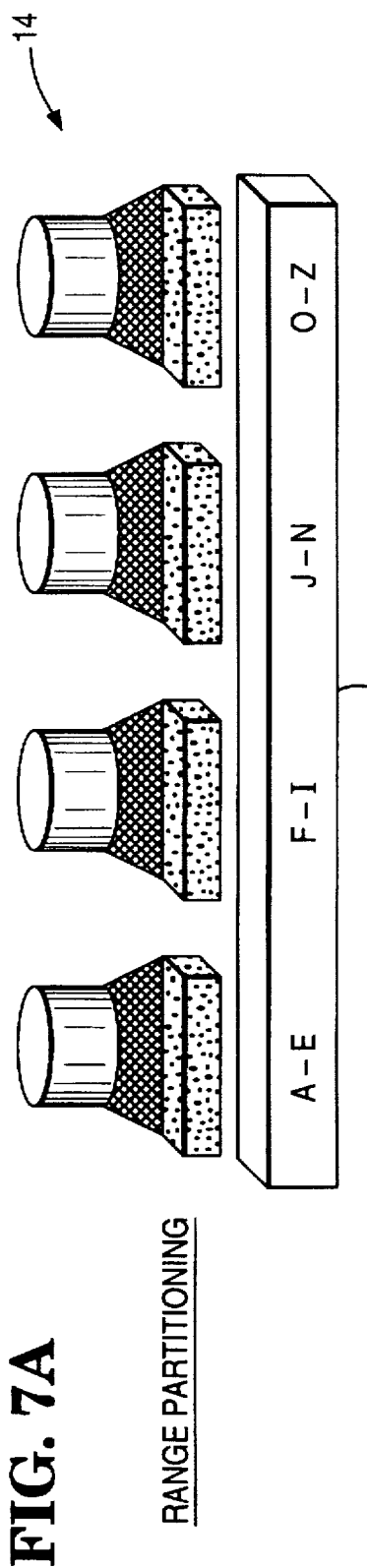
FIGS. 7A, 7B, and 7C illustrate the database partitioning methods of the present invention.
Figure 7B:
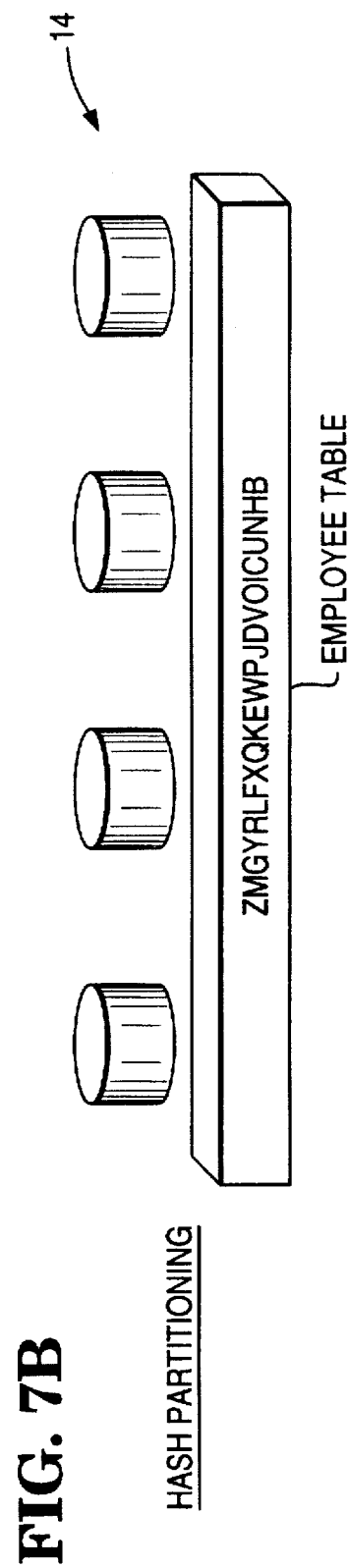
Figure 7C:
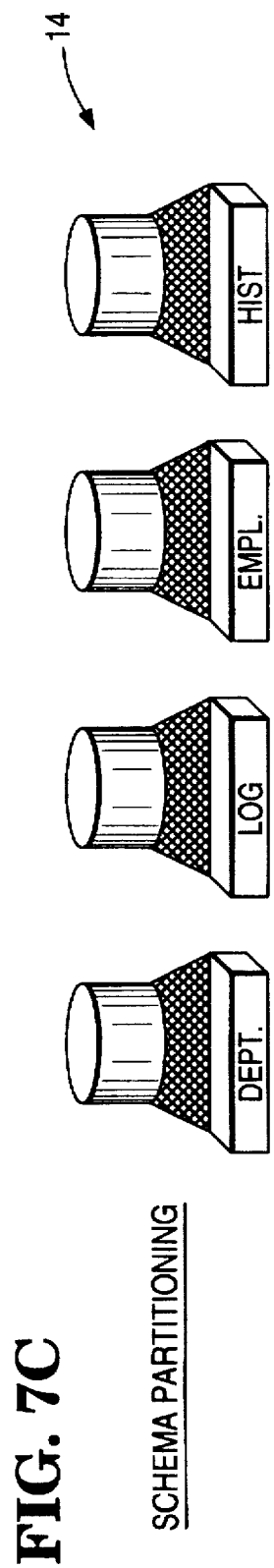

FIGS. 7A, 7B, and 7C illustrate the database partitioning methods of the present invention. Different applications lend themselves to certain types of database requests. Physical placement of a database can dramatically affect performance in an multi-processor computer system. This partitioning becomes the basis for distribution of the rows of data on each individual SQL Server 42. The Navigation Server 22 allows any number of SQL Servers 42 to participate in owning the table partitions. This group of SQL Servers 42 is called the home of the table. The Navigation Server 22 allows the database to be uniquely partitioned both vertically and horizontally. Preferably, there are three partitioning options: range, hash, and schema.

Requests that are based on a range of values that are commonly accessed by one key operate most efficiently if the data being accessed is arranged throughout the system by a range of values. Range partitioning partitions or divides the database based on the values of the primary keys of the table, as illustrated in FIG. 7A. This type of data arrangement throughout the system can eliminate unnecessary disk access to large parts of any given table and provide parallel access to a portion of the table. In addition, this type of data partitioning allows for clustering of multiple table partitions with common ranges located on the same set of disk drives within the system.

When access to an entire table is required and the tables are very large, then using a hash function to evenly distribute the rows throughout the system allows for the most efficient access to the data in parallel. Hash partitioning divides the data based on rows, as illustrated in FIG. 7B. The primary keys of the table are run through a hashing algorithm producing a hash partitioning key. This helps to provide for an even work load throughout the system for these types of requests.

Some types of requests require access to small tables in conjunction with large,tables. Partitioning these tables is not cost effective, although the placement of these small tables throughout the system may be best located near some other large partitioned table. Moreover, the small tables can be replicated to further assist in database access and retrieval. Schema partitioning divides the data based on tables, wherein the tables are completely owned by a given SQL Server 42, as illustrated in FIG. 7C. This is frequently convenient if the table is very small, used in many joins with differing tables, or widely used in a distributed database environment.

The Navigation Server 22 and multiple partitioning methods introduce many options for laying out the data and choosing the physical and logical configurations. These options can be selected and defined directly by the end user or can be automatically and transparently calculated by an automated configuration process.

CAPACITY PLANNING AND DATA DESIGN

FIG. 8 illustrates the flow of execution for the automated configuration process in the present invention. The highly parallel nature of the present invention introduces many options for choosing the physical and logical configurations of hardware, software and data. Database design, both logical and physical, is an especially difficult task, because of the highly parallel nature of the computer system of the present invention. Often times data reorganizations must be performed in order to achieve peak performance of the present invention.

While there are existing tools for database design in the prior art, the present invention provides a complete toolset for the initial configuration selection, design, tuning, and integration of distributed components. The present invention provides a configuration process so that these options can be selected and defined directly by a user, or can be automatically and transparently calculated.

The configuration process uses three basic tools and a data dictionary to perform its functions. The tools include the DEFT™ Computer Assisted Software Engineering (CASE) system from SYBASE™ which incorporates an Entity Relationship Modeler (ERM) and Data Flow Modeler (DFM). In addition, a Capacity Planning Modeler (CPM) is provided. All of the modelers access and store data in the dictionary. The three modelers allow a user to build models of the database and application design, and then perform capacity planning and performance analysis functions on the database and application models.

Block 70 represents the ERM being used to logically design a relational database by defining data entities and modeling static relationships between data entities. Preferably, the ERM supports two popular notation methods: Martin notation and a modified form of Bachman/Chen notation. Table definitions, table size (number of rows) and fault tolerance requirements (e.g., mirroring) information are examples of information that are entered through the ERM. Moreover, SQL Data Definition Language (DDL) statements in the dictionary can be input into the ERM model.

Block 72 represents the DFM being used to model the data flow of information through a proposed parallel system, and block 74 represents the DFM being used to analyze the application workload. Preferably, the DFM supports two popular dataflow diagraming methods: Yourdon and Gane & Sarson. The DFM uses a description of an application's transactions and SQL commands (select, insert, etc.) within the transaction to model the data flow of information and analyze the workload. The description of the application's transactions includes performance characteristics such as arrival rate and response times. The SQL statements from the dictionary can be imported into the DFM.

Block 76 represents the CPM using the ERM-defined databases and DFM-defined workloads as inputs to simulate the effect of the workload on physical database placement, hardware resources requirements, and performance estimations for the system. In effect, the CPM creates a simulation of a proposed hardware and software configuration to store the modeled database and run the modeled workload. Block 78 represents the CPM generating the hardware and software configurations for the system, which can be done automatically or defined manually by the user. In addition, block 80 represents the CPM generating a data partitioning scheme for the database, which can be done automatically or defined manually by the user. Whether automatically generated or created from scratch, a user has complete editing capabilities for any configuration. Using the simulation of the proposed hardware and software configuration to store the modeled database and run the modeled workload, the CPM can provide resource utilization, throughput, and response time performance estimations. The CPM uses cost-based formulae to determine average and peak resource utilization during user specified intervals. This information provides rough estimates aimed at quickly identifying obvious performance bottlenecks. The CPM also allows users to answer "what if" questions for data distribution, hardware and software configurations, or workload changes. Performance information can be displayed in graphical or report formats.

One of the most important features of the ERM, DFM and CPM tools are that they allow the use of information captured from an actual computer system in the configuration process for further capacity planning and performance analysis. Thus, the computer system, database and transactions are used to perform simulations, so that the effects of future changes can be gauged. This reverse engineering of a system provides an effective mechanism for tuning the system as the database grows or as applications workloads change. It also provides a tool for users to accurately determine the resource requirements needed for future growth. Moreover, the use of such "real" information provides an accurate measure of the accuracy of the modeling tools.

CONCLUSION

This concludes the description of the preferred embodiment of the invention. In summary, the present invention discloses a method and apparatus for operating parallel databases in a multi-processor computer system. In the present invention, Client Applications interact with a Navigation Server executing on the system, and through it, with one or more Data Servers. The Navigation Server receives requests from the Client Applications, which it compiles or translates into a plurality of parallel SQL statements. These parallel SQL statements are communicated to particular ones of the Data Servers for execution. The Data Servers, each of which may execute on different processors in the system, perform their respective SQL statements and thus access their database partitions concurrently and in parallel, thereby reducing the overall access time of a given request from a given Client Application. The system behaves, and is presented to users, as if the database resides under the control of a single Data Server, even though the database is partitioned across multiple Data Servers.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A multi-processor database storage and retrieval system, comprising:

(a) a plurality of interconnected processors storing a database, wherein the database is comprised of a plurality of database partitions, and each of the partitions is selected from a group comprising range partitions, schema partitions and hash partitions;

(b) one or more client processes, executed on one or more of the processors, for interfacing with an operator in formulating a request for a database operation;

(c) at least one navigation server process, executed on one of the processors and in communication with the client processes, for receiving the request for the database operation from the client process, and for translating the request for the database operation into a plurality of parallel sub-operations, wherein the navigation server process comprises means for accessing a global directory containing locations of the database partitions, and for identifying database server processes that access a particular one of the database partitions, and means for determining an execution strategy for the request based on the locations of the database partitions referenced in the request and for generating the plurality of sub-operations according to the execution strategy; and (d) a plurality of database server processes, executed on a plurality of the processors and in communication with the navigation server process, for performing the plurality of parallel sub-operations concurrently, wherein each of the database server processes accesses one or more of the database partitions and each of the sub-operations is performed concurrently against a particular one of the database partitions, thereby reducing an overall access time of the request from the client process.

2. The invention as set forth in claim 1 above, wherein the navigation server further comprises means for interacting with the operator as though the database partitions reside under the control of a single database server process.

3. The invention as set forth in claim 1 above, wherein the means for determining further comprises means for retrieving a plurality of pre-defined parallel SQL statements from a memory store corresponding to the request.

4. The invention as set forth in claim 1 above, wherein the means for determining further comprises means for translating the request into a plurality of pre-defined parallel SQL statements.

5. The invention as set forth in claim 1 above, wherein each of the data server processes comprises means for performing one or more of the plurality of parallel sub-operations to generate the preliminary result; and wherein the navigation server process comprises means for combining the preliminary results into a final result and means for returning the final result to the client process via the navigation process.

6. The invention as set forth in claim 5 above, wherein the means for combining further comprises means for combining the preliminary results into a temporary database partition and for performing one or more of the plurality of parallel sub-operations against the temporary database partition to generate the final result.

7. The invention as set forth in claim 1 above, wherein the plurality of parallel sub-operations comprises a plurality of parallel Structured Query Language commands.

8. A method of database storage and retrieval, comprising the steps of:

(a) receiving a request for a database operation from an operator to be performed against a database stored on a parallel computer system, wherein the database is comprised of a plurality of database partitions, and each of the database partitions are selected from a group comprising range partitions, schema partitions, and hash partitions;

(b) translating the request for the database operation into one or more parallel sub-operations, wherein the translating step further comprises the steps of accessing a global directory containing locations of the database partitions, determining an execution strategy based on the locations of the database partitions referenced in the request, and generating the plurality of sub-operations from the execution strategy; and (c) performing the parallel sub-operations concurrently, wherein each of the sub-operations references one or more of the database partitions and is performed concurrently against the referenced database partitions, thereby reducing an overall access time of the request.

9. The invention as set forth in claim 8 above, wherein the determining step further comprises the step of retrieving a plurality of pre-defined parallel sub-operations from a memory store corresponding to the request.

10. The invention as set forth in claim 8 above, wherein the determining step further comprises the step of translating the request into a plurality of pre-defined parallel sub-operations.

11. The invention as set forth in claim 8 above, wherein the performing step comprises the steps of:
   (1) performing one or more of the plurality of parallel sub-operations to generate the preliminary result; and
   (2) combining the preliminary results into a final result and returning the final result to the operator.

12. The invention as set forth in claim 11 above, wherein the combining step further comprises the steps of combining the preliminary results into a temporary database partition and performing one or more of the plurality of parallel sub-operations against the temporary database partition to generate the final result.

13. The invention as set forth in claim 8 above, wherein the plurality of parallel sub-operations comprises a plurality of parallel SQL statements.

14. A method for accessing database on a computer system, comprising the steps of:
   (a) accepting, into the computer, a request for a database operation to be performed against a database stored on the computer, wherein the database is comprised of a plurality of database partitions, and each of the partitions is selected from a group comprising range partitions, schema partitions, and has partitions;
   (b) translating, in the computer, the request for the database operation into a plurality of parallel sub-operations, wherein the translating step further comprises the steps of accessing a global directory containing locations of the database partitions, determining an execution strategy based on the locations of the database partitions referenced in the request, and generating the plurality of sub-operations from the execution strategy;
   (c) executing, in the computer, each of the plurality of parallel sub-operations in a concurrent manner to generate a preliminary result for each of the sub-operations, wherein each of the sub-operations references one or more of the database partitions concurrently, thereby reducing the overall access time of the request;
   (d) combining, in the computer, the preliminary results generated from each of the plurality of parallel sub-operations into a temporary database partition;
   (e) executing, in the computer, a combining operation against the temporary database partition to generate a final result; and
   (f) returning the final result to the operator in response to the request.

15. The invention as set forth in claim 14 above, wherein the determining step further comprises the step of retrieving a plurality of pre-defined parallel sub-operations from a memory store corresponding to the request.

16. The invention as set forth in claim 14 above, wherein the determining step further comprises the step of translating the request into a plurality of pre-defined parallel sub-operations.

17. The invention as set forth in claim 14 above, wherein the plurality of parallel sub-operations comprises a plurality of parallel Structured Query Language statements.

18. A computerized database storage and retrieval system, comprising:
   (a) one or more processors;
   (b) one or more data storage devices storing one or more databases, wherein each of the databases is partitioned into a plurality of database partitions according to a partitioning type selected from a group comprising range, hash, and schema partitions;
   (c) a navigation server for receiving a request for a database operation from an operator, for translating the request into a plurality of parallel queries, for combining a preliminary result from each of the queries to create a final result, and for returning the final result to the operator, wherein the navigation server comprises means for accessing a global directory containing locations of the database partitions and for identifying the database server processes that access a particular database partition, and means for determining an execution strategy for the request based on the locations of the database partitions referenced in the request and for generating the plurality of queries according to the execution strategy; and
   (d) a plurality of database servers, in communication with the navigation server, for receiving the parallel queries from the navigation server, for performing each of the parallel queries to generate the preliminary results, and for returning the preliminary results to the navigation server, wherein each of the database servers manages one or more of the database partitions and each of the queries references one or more of the database partitions, so that the queries are performed concurrently and thus each database partition is accessed concurrently, thereby reducing the overall access time of the request.

19. The invention as set forth in claim 18 above, wherein the navigation server further comprises means for interfacing with the operator as though the database partitions reside under the control of a single database server.

20. The invention as set forth in claim 18 above, wherein the means for determining further comprises means for retrieving a plurality of pre-defined parallel queries from a memory store corresponding to the request.

21. The invention as set forth in claim 18 above, wherein the means for determining further comprises means for translating the request into a plurality of pre-defined parallel queries.

22. The invention as set forth in claim 18 above, wherein the means for combining further comprises means for combining the preliminary results into a temporary database partition and for performing one or more of the plurality of parallel queries against the temporary database partition to generate the final result.

23. A method for configuring a multi-processor computer system, comprising the steps of:
   (a) logically designing a relational database by defining data entities and modeling static relationships between data entities;
   (b) modeling the workload on a simulation of the multi-processor system, wherein the modeling step comprises the steps of describing transactions performed on the multi-processor system that access the data entities and specifying performance characteristics for the transactions;
   (c) simulating the effect of the modeled workload on physical placement of the relational database on the multi-processor system, on hardware and software resources requirements for the multi-processor system, and on performance estimations for the transactions performed on the multi-processor system; and
   (d) generating one or more hardware and software configurations for the multi-processor system and a data partitioning scheme for the relational database stored on the multi-processor system, according to the modeling and simulating steps.

24. The invention as set forth in claim 23 above, further comprising the step of reverse engineering an installed multi-processor system to identify the data entities, the relationships between the data entities, the workload, the transactions, and the performance characteristics.

* * * * *